(12) United States Patent
Cooper

(10) Patent No.: US 7,788,463 B2
(45) Date of Patent: Aug. 31, 2010

(54) CYCLIC BUFFER MANAGEMENT

(75) Inventor: Kenneth H. Cooper, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 11/674,439

(22) Filed: Feb. 13, 2007

(65) Prior Publication Data

US 2008/0195838 A1 Aug. 14, 2008

(51) Int. Cl.
*G06F 12/06* (2006.01)
*G06F 3/00* (2006.01)

(52) U.S. Cl. .................... 711/203; 711/147; 710/52; 710/56; 365/189.05

(58) Field of Classification Search ................ None
See application file for complete search history.

(56) References Cited

U.S. PATENT DOCUMENTS

| | | | |
|---|---|---|---|
| 5,359,468 A | 10/1994 | Rhodes et al. | |
| 5,373,493 A | 12/1994 | Iizuka | |
| 5,974,478 A | 10/1999 | Wood et al. | |
| 5,982,459 A | 11/1999 | Fandrianto et al. | |
| 6,310,898 B1 | 10/2001 | Schwartz | |
| 6,598,097 B1 | 7/2003 | Daniels et al. | |
| 6,637,031 B1 | 10/2003 | Chou | |
| 6,807,615 B1* | 10/2004 | Wong et al. | 711/202 |
| 7,085,710 B1 | 8/2006 | Beckert et al. | |
| 7,110,006 B2 | 9/2006 | MacInnis et al. | |
| 2004/0054837 A1* | 3/2004 | Biran et al. | 710/305 |
| 2004/0111443 A1* | 6/2004 | Wong et al. | 707/202 |
| 2004/0181644 A1* | 9/2004 | Maor | 711/203 |
| 2006/0074637 A1 | 4/2006 | Berreth | |

OTHER PUBLICATIONS

Savell, "The EMU10K1 Digitial Audio Processor", available as early as Dec. 13, 2006, at <<http://ieeexplore.ieee.org/iel14/40/16354/00755467.pdf?isNumber=>>, IEEE 1999, pp. 49-57.
Kay, "Path IDs: A Mechanism for Reducing Network Software Latency", available as early as Dec. 13. 2006, at <<www-cse.ucsd.edu/groups/cls/pubs/phd/jkay.thesis.ps>>. Jonathan Simon Kay 1994, pp. 1-93.

* cited by examiner

*Primary Examiner*—Than Nguyen
(74) *Attorney, Agent, or Firm*—Lee & Hayes, PLLC

(57) ABSTRACT

Systems and methods for cyclic buffer management are described. In one aspect, the systems and methods enable cyclic buffer wrap-around write operations independent of temporary buffer allocations and corresponding multiple data copies. To this end, the systems and methods map the cyclic buffer's physical addresses two-times ("doubly map") to a consecutive block of virtual memory. When an application desires to write beyond the end of what represents the cyclic buffer, the systems and methods provide a logical pointer to the doubly mapped virtual memory, enabling the application to directly write into the virtual memory from the end of the first cyclic buffer mapping to the beginning of the second cyclic buffer mapping. The memory management operations automatically transfer the data out of this doubly mapped virtual memory into the cyclic buffer for subsequent extraction and presentation to the user.

16 Claims, 3 Drawing Sheets

CYCLIC BUFFER MANAGEMENT

BACKGROUND

Audio direct memory access (DMA) hardware typically loops over a buffer of physical/tangible memory in a cyclic fashion. Software reads a current position of a hardware DMA transfer within the cyclic buffer and reads or writes data to or from the buffer accordingly. Given that the buffer is cyclic, the software manages the data write wrap-around from the end of the buffer back to the beginning of the buffer either by exposing two individual transfers to a client application or by performing an interim data copy into physical memory on behalf of the client to facilitate the second transfer.

For example, a client application ("client") such as a media player typically sets up audio streaming by requesting middleware to allocate a cyclic buffer of physical memory. Responsive to this request, a single block of virtual memory is mapped to a physical cyclical buffer in system memory. At this point, middleware manages all data I/O into the virtual memory block. Conventional memory management operations automatically transfer data written into the virtual memory block into corresponding addresses of the cyclic buffer in physical memory. When the client requests a pointer from the middleware to write data into the virtual memory beyond the end of the virtual memory, the middleware typically avoids buffer overflow by sending the client a pointer to a temporary buffer. After the client has written into the temporary buffer, the middleware transfers data bytes from the temporary buffer into the virtual memory block until the end of the virtual memory block is reached. Then, the middleware transfers the remaining data from the temporary buffer into the beginning of the virtual memory block. In this manner, the middleware manages wraparound data transfers to the cyclic buffer without buffer overflow. However, such buffer wrap-around management and additional data copies reduce system performance and increase the minimum achievable latency of an audio stream.

SUMMARY

Systems and methods for cyclic buffer management are described. In one aspect, the systems and methods enable cyclic buffer wrap-around write operations independent of temporary buffer allocations and corresponding multiple data copies. To this end, the systems and methods map the cyclic buffer's physical addresses two-times ("doubly map") to a consecutive block of virtual memory. When an application desires to write beyond the end of what represents the cyclic buffer, the systems and methods provide a logical pointer to the doubly mapped virtual memory, enabling the application to directly write into the virtual memory from the end of the first cyclic buffer mapping to the beginning of the second cyclic buffer mapping. The memory management operations automatically transfer the data out of this doubly mapped virtual memory into the cyclic buffer for subsequent extraction and presentation to the user.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Systems and methods for cyclic buffer management are described. The systems and methods double map addresses of a physical cyclic buffer into a contiguous block of virtual memory. This provides two different virtual addresses for each physical address of the cyclic buffer. A client application such as a media player, etc., directly writes all data into the double-mapped virtual memory. A conventional memory manager automatically transfers data from the mapped virtual memory to the cyclic buffer. This double-mapping allows the client application to directly write data into virtual memory addresses that are mapped to physical addresses that wrap-around the boundaries of physical cyclic buffer. This is very different than conventional cyclic buffer management operations, where the client is typically required to write the data into a temporary buffer provided by a middleware application. Once written into, the middleware application would transfer the data from the temporary buffer via two data transfers into respective back/end and front/beginning portions of a single virtual memory block mapped to the physical cyclic buffer. Alternatively, conventional wraparound solutions involved requesting the client to implement multiple data writes one transfer to the end of memory and another to the beginning of memory. Thus, and in contrast to conventional systems, the described systems and methods for cyclic buffer management allow the client to directly write data that will wrap around the boundaries of the physical cyclic buffer into double mapped virtual memory. This is completely independent of the use of a temporary buffer, multiple data copies, and/or multiple data transfers by different buffer management operations to manage cyclic buffer wraparound scenarios.

These and other aspects of the systems and methods for cyclic buffer management are now described in greater detail An Exemplary System Although not required, systems and methods for selective inter-layer prediction in layered video coding are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
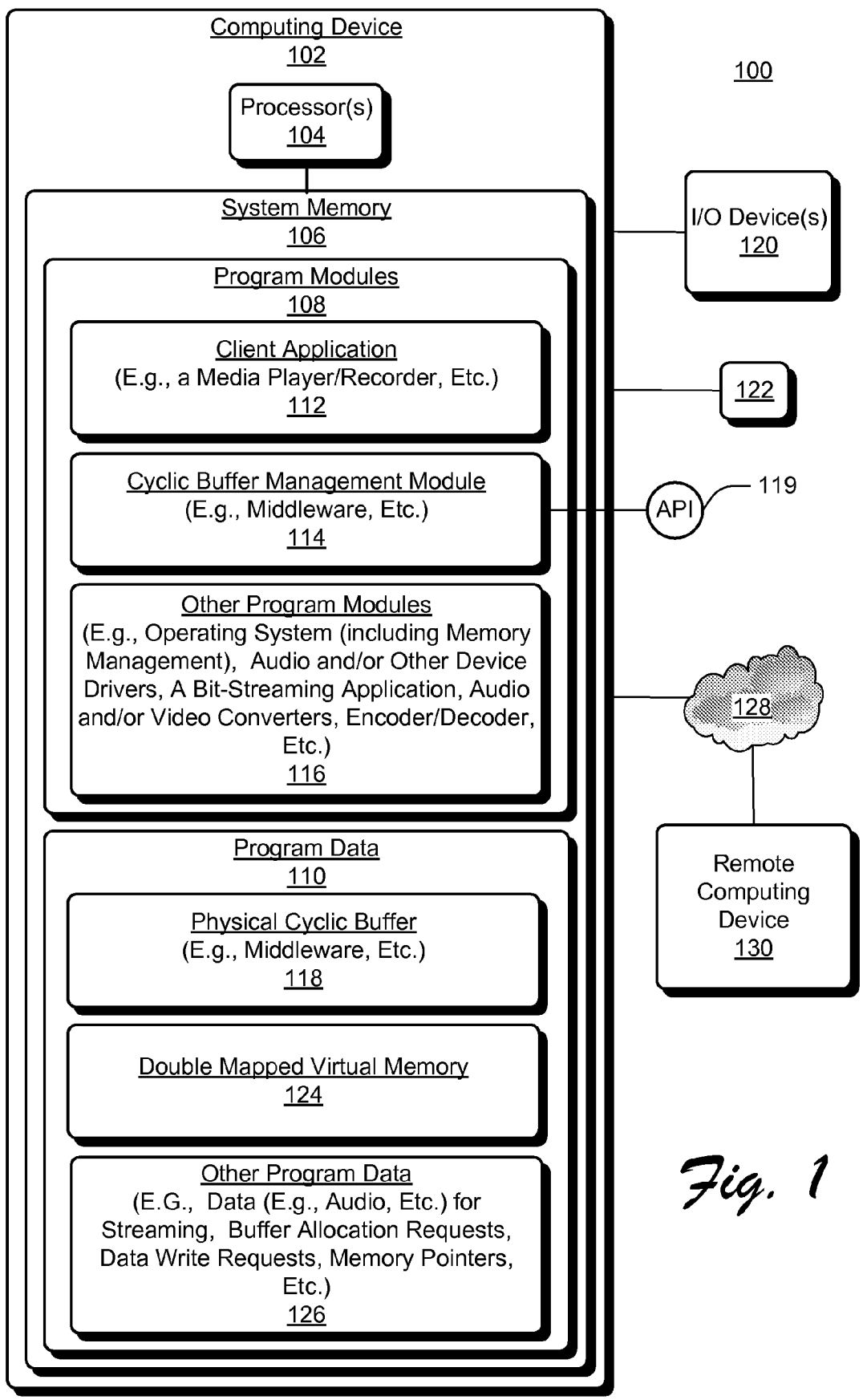
FIG. 1 shows an exemplary system for cyclic buffer management, according to one embodiment.

FIG. 1 shows an exemplary system 100 for cyclic buffer management, according to one embodiment. System 100 includes a computing device 102, for example a general purpose computing device, a server, a laptop, a mobile computing device, and/or so on. Computing device 102 includes one or more processors 104 coupled to a tangible computer-readable storage medium (e.g., system memory 106). Processor 104 may be a microprocessor, microcomputer, microcontroller, digital signal processor, etc. System memory 106 is tangible/physical memory. System memory 106 includes, for example, volatile random access memory (e.g., RAM) and non-volatile read-only memory (e.g., ROM, flash memory, etc.). System memory 106 comprises computer-program instructions executable by processor 104, and program data that is generated and/or used by respective ones of the computer-program instructions. Such computer-program instructions and program data are respectively shown as program modules 108 and program data 110. In this implementation, program modules 108 include, for example, a client application 212, cyclic buffer management module 214 and "other program modules" 116 such as an Operating System (OS) to provide a runtime environment (including, for example, memory management), and audio in/or other device drivers, a bit streaming application, audio and/or video converters, encoders/decoders, and/or so on.

Client application 112 ("client") requests cyclic buffer management module 114 to allocate a physical cyclic buffer 118 of available space. In one implementation, client 112 is a media player for presenting audio via one or more I/O devices 120 to a user. In such an implementation, for example, client 112 requests cyclic buffer management module 114 to allocate a buffer 118 to present audio in a particular audio format to the user. In one implementation, this request is provided to the cyclic buffer management module 114 via an exposed application programming interface (API) 119. Responsive to receiving the request to allocate the physical cyclic buffer 118, cyclic buffer management module 114 allocates the physical cyclic buffer 118. In one implementation, for example, cyclic buffer management module 114 requests an audio device driver to allocate the physical cyclic buffer 118 to set up audio streaming for the client application 112. For purposes of exemplary illustration, such device charters are shown as a respective portion of "other program modules" 116. In this implementation, the physical cyclic buffer is device accessible memory suitable for conventional DMA extraction and streaming operations by a hardware device 122. In one implementation, the hardware device is an audio hardware device that is leveraged by client application 112 (e.g., a media player application) to extract audio data out of the cyclic buffer 118 to stream audio for presentation to an end user.

Cyclic buffer management module 114 doubly maps or mirrors the physical addresses of the cyclical buffer 118 into two consecutive blocks of virtual memory that is directly accessible by the client 112. In this implementation, the two consecutive blocks of virtual memory, which are shown as double mapped virtual memory 124, are page aligned at the boundary between the respective virtual memory blocks to facilitate conventional memory management operations. Since the physical cyclic buffer 118 is double-mapped and virtual memory, double mapped virtual memory 124 provides two different virtual addresses for each physical address of the cyclic buffer 118. The client application 112 directly writes data (e.g., for data storage/recording/streaming operations, etc.) into respective portions of the double-mapped virtual memory 124. To this end, cyclic buffer management module keeps track of the current position for input into the double mapped virtual memory 124 and the number of bytes of data being written into the double mapped virtual memory 124.

Responsive to a request from a client 112 to write a certain amount of data into the virtual memory, cyclic buffer management module 114 returns a logical memory address pointer to client 112, the pointer enabling the client can to write the data directly into the doubly mapped virtual memory 124. Such pointers are shown as respective portions of "other program data" 126. Responsive to receiving the pointer, client 112 directly writes the indicated number of data bytes into the doubly mapped virtual memory 124. This is the case even when the virtual memory addresses being written into map to physical addresses in the cyclic buffer 118 that wrap around from the end of the cyclic buffer 118 to the beginning of the cyclic buffer 118. Exemplary such operations are now described with respect to FIG. 2.

Figure 2:
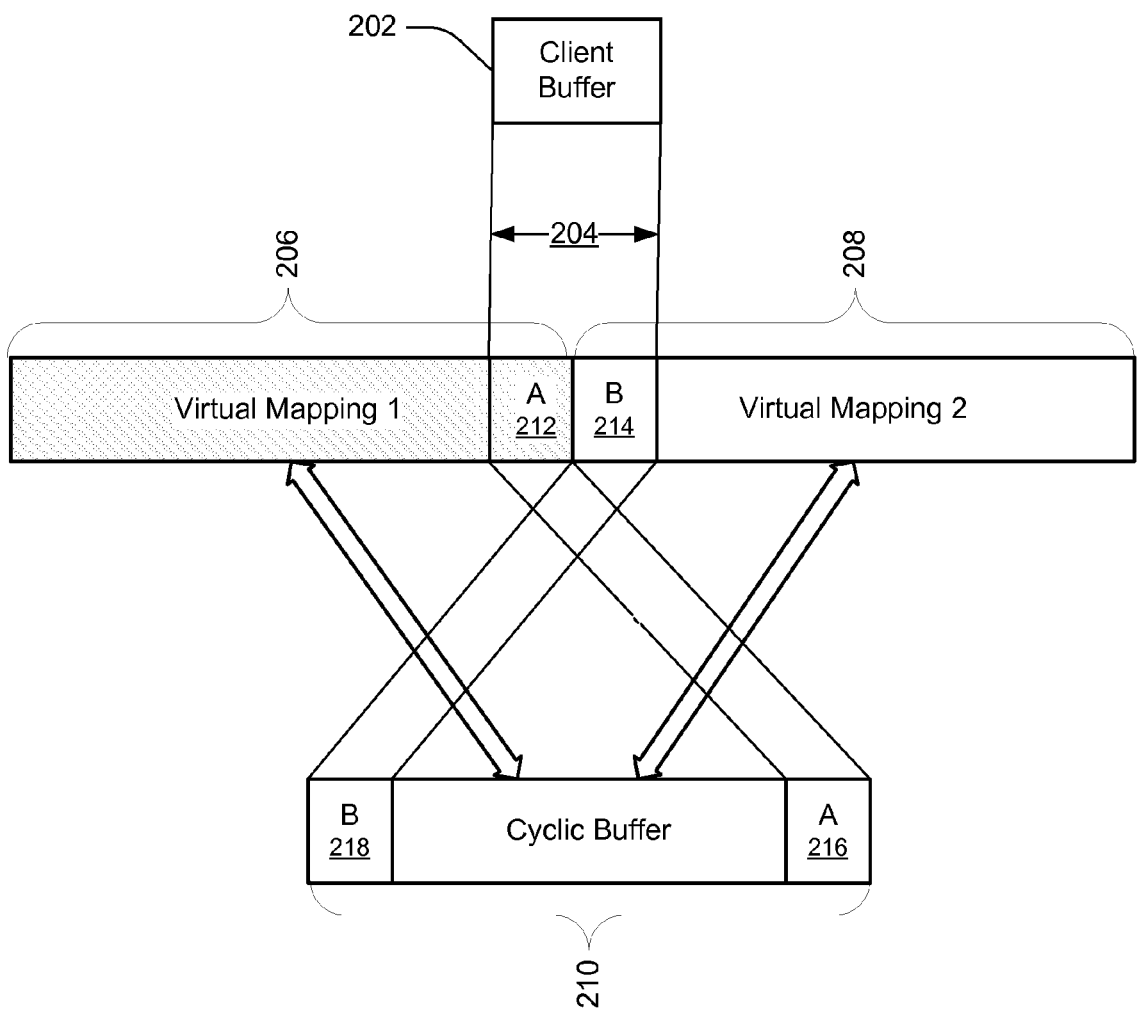
FIG. 2 shows an exemplary double mapping of a physical cyclical buffer into virtual memory for data transfers, according to one embodiment

FIG. 2 shows an exemplary double mapping of a physical cyclical buffer into virtual memory for data transfers, according to one embodiment. For purposes of exemplary illustration and description, aspects of FIG. 2 are described with respect to FIG. 1. The left-most reference numeral of a component refers to the figure where the component was first introduced. As shown in the example of FIG. 2, a single data transfer 204 by a client 112 (FIG. 1) from a client buffer 202 may span the boundary between first 206 and second 208 virtual mappings of a single cyclic buffer 210 in physical memory. These first and second virtual mappings 206 and 208 collectively represent an example of the double mapped virtual memory 124 FIG. 1. Additionally, these cyclic buffer 210 is an example of physical cyclic buffer 118 FIG. 1.

Client 112 directly writes portion A 212 of data transfer 204 at the end of the first virtual mapping 206, and client 112 directly writes portion B 214 at the beginning of the second virtual mapping 208. In this example, the boundary between the first and second virtual mappings is the boundary between A 212 and B 214. A conventional hardware memory manager (shown as respective portion of "other program modules" 116) automatically transfers data from portion A 212 to the end (portion A 216) of the cyclic buffer 210 due to the first virtual mapping 206. Analogously, the memory manager automatically transfers data from portion B 214 to the front (portion B 218) of the cyclic buffer 210 due to the second virtual mapping 208. The net result is that client 112 writes all data that wraps around mapped boundaries of cyclic buffer 210 to double mapped virtual memory (e.g. virtual mappings 2 and 2) in a single data transfer independent of multiple copies of the data into the back and front of the virtual memory by middleware buffer management operations.

In this implementation, when client 112 completes data transfer 204, a data transfer that extends into the second virtual mapping 208, the cyclic buffer management module 114 will reset the virtual memory address pointer for the next data transfer back to the beginning of first virtual mapping 206 offset by the size of portion B 214.

Exemplary Procedure

Figure 3:
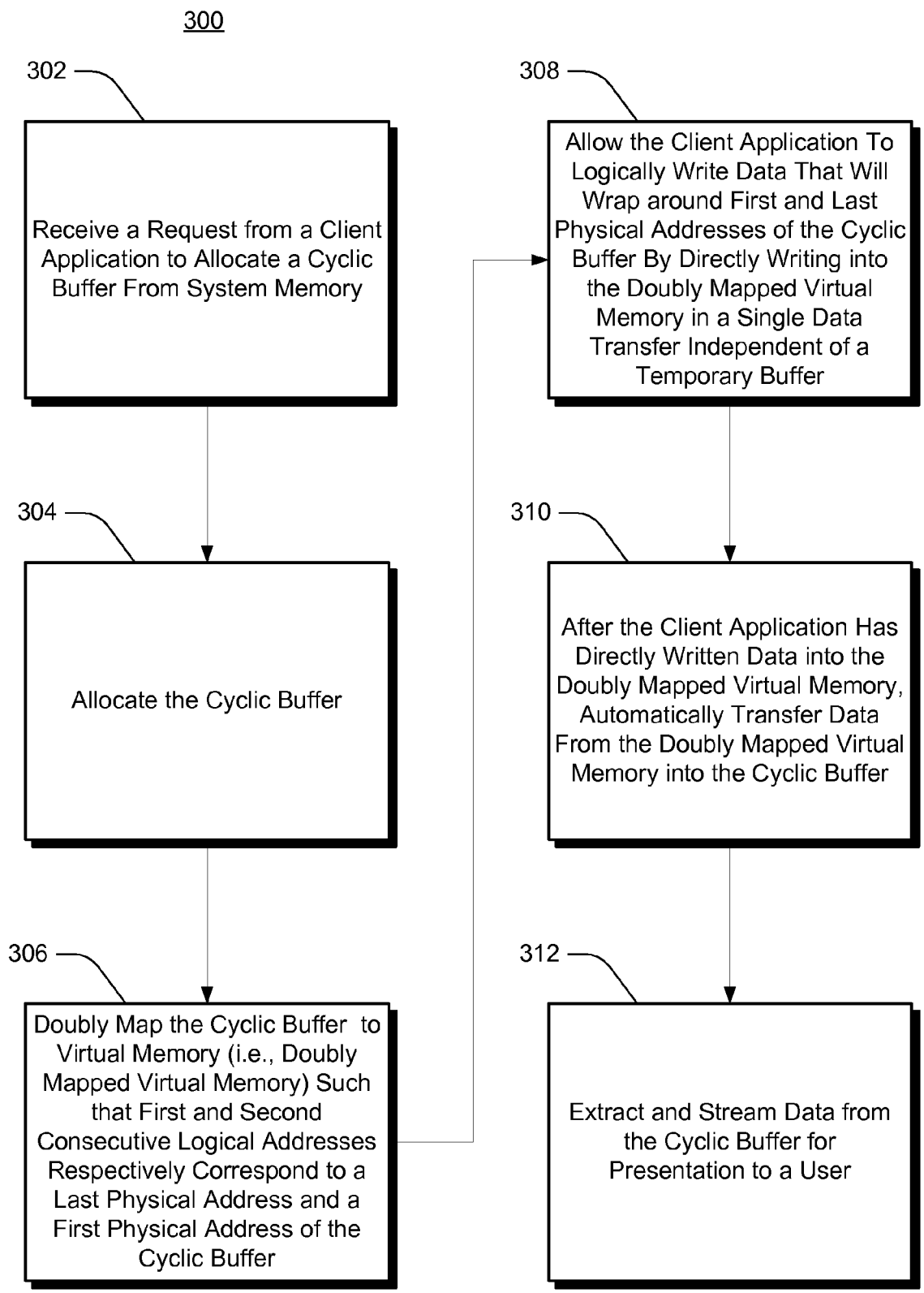
FIG. 3 shows an exemplary procedure for cyclic buffer management, according to one embodiment.

FIG. 3 shows an exemplary procedure 300 for cyclic buffer management, according to one implementation. In one implementation, operations of procedure 300 are implemented by respective program modules 108 of computing device 102 of FIG. 1. For purposes of exemplary illustration and description, the operations of procedure 300 are described with respect to the components and various aspects of FIGS. 1 and 2. In this description, the left-most numeral of a component/operation (step) reference number represents the figure in which the component/operation was first introduced.

Operations of block 302 receive a request from a client application 112 to allocate a cyclic buffer 118 from system memory 106. In one implementation, the request is received via an application program interface 119 exposed by cyclic buffer management module 114. In one implementation, the client application sends the request to a service implemented by cyclic buffer management module 114. Operations of block 304, responsive to receiving the request, allocate the cyclic buffer 118. Operations of block 306 doubly map the cyclic buffer 118 to consecutive portions of virtual memory (i.e., doubly mapped virtual memory 124). That is, the doubly mapped virtual memory 124 includes first and second virtual mappings of the cyclic buffer such that each physical address of the cyclic buffer is represented by two different logical addresses. For instance, the mapping is such that a last logical address of the first virtual mapping represents the last physical address of the cyclic buffer. Immediately following the last logical address of the first virtual mapping, is a first logical address of the second virtual mapping. This first logical address of the second virtual mapping corresponds to a first physical address in the cyclic buffer. Please see exemplary FIG. 2 and corresponding description above for further illustration. In this manner, last and first physical addresses are represented in this particular sequence with corresponding logical addresses. In one implementation, the first and second virtual mappings are page aligned at least at the boundary between the two mappings.

Operations of block 308 allow the client application 112 to logically write data directly into the doubly mapped virtual memory 124. In one implementation, this is accomplished by returning a pointer to a virtual address to the client application, wherein the pointer represents a current input position with respect to the doubly mapped virtual memory. Significantly, the client can use such a pointer to directly right data into memory locations in the doubly mapped virtual memory 124 that are mapped to the end and the beginning of the cyclic buffer 118 in a single data transfer. Since the client writes directly into the memory locations, system 100 allows the client to perform this data transfer that essentially wraps around the boundaries of the cyclic buffer 118. This is accomplished independent of any need to allocate and write into a temporary buffer. Thus, subsequent buffer management operations to implement multiple data transfers from the temporary buffer to respective beginning and end portions of the cyclic buffer are not necessary.

Operations of block 310 automatically transfer data from the doubly mapped virtual memory 124 into the cyclic buffer 118. In this implementation, such automatic transfer operations are automatically implemented by conventional memory management operations. The logic that implements these conventional operations are configured with the size of the cyclic buffer 118, and thus, automatically loop around boundaries of the cyclic buffer 118 during data transfer operations. Operations of block 312 extract and stream data from the cyclic buffer 118 for presentation via an I/O device 120 (e.g., speakers, display device, and/or so on) to a user. In one implementation, video streaming hardware extracts the data from the cyclic buffer for presentation to the user. Exemplary such streaming hardware are represented by component 122 of FIG. 1.

CONCLUSION

Although the above sections describe cyclic buffer management in language specific to structural features and/or methodological operations or actions, the implementations defined in the appended claims are not necessarily limited to the specific features or actions described. Rather, the specific features and operations for cyclic buffer management are disclosed as exemplary forms of implementing the claimed subject matter. For example, although computing device 102 of FIG. 1 has been described as a standalone device, in another implementation, computing device 102 is coupled across a network 128 to at least one remote computing device 130. In this scenario, computing device 102 streams data (shown as respective portion of "other program data" 126) to the remote computing device 132 for presentation to the user.

The invention claimed is:

1. A computer-implemented method for cyclic buffer management, the method comprising:
    doubly mapping physical addresses associated with a cyclic buffer of tangible memory to logical addresses to create doubly mapped virtual memory, the doubly mapped virtual memory comprising:
        two different logical addresses for each physical address of the cyclic buffer; and
        a fist virtual mapping of the cyclic buffer to a first virtual memory block and a second virtual mapping of the cyclic buffer to a second virtual memory block, the first virtual memory block and the second virtual memory block being consecutive in the virtual memory;
    enabling a client application to write in a single data transfer directly into the doubly mapped virtual memory independent of whether logical addresses being written into correspond to physical addresses corresponding to an end of the cyclic buffer and a beginning of the cyclic buffer;

and
    wherein the data and the cyclic buffer is for extraction and presentation in a data stream to a user.

2. The method of claim 1, wherein an end portion of the first virtual mapping is page aligned with a beginning portion of the second virtual mapping.

3. The method of claim 1, wherein the client application is an audio streaming application.

4. The method of claim 1, wherein enabling the client application to write directly into the doubly mapped virtual memory further comprises communicating a logical memory address pointer to the client indication, the logical memory address pointer indicating a current position in the doubly mapped virtual memory to write data.

5. The method of claim 1, wherein the method further comprises:
    receiving a request from the client application to allocate the cyclic buffer; and.
    responsive to receiving the request, allocating the cyclic buffer via a device driver.

6. The method of claim 1, wherein the method further comprises transferring data from consecutive logical addresses in the doubly mapped virtual memory into the cyclic buffer, the consecutive logical addresses sequentially corresponding to a last physical address of the cyclic buffer and a first physical address of the cyclic buffer.

7. The method of claim 1, wherein the method further comprises streaming the data from the cyclic buffer for presentation to a user.

8. A tangible computer-readable medium comprising computer-executable instructions for cyclic buffer management, the computer-textual instructions comprising instructions for:
    allocating a cyclical buffer in physical memory for audio streaming;
    mapping a first address and a second address of the cyclical buffer to a first virtual memory block and a second virtual memory block, the first virtual memory block and the second virtual memory block being consecutive in a virtual memory and page aligned;

responsive to request from an audio application to write an amount of data into the cyclical buffer that will wrap around the end of the cyclical buffer to the beginning of the cyclical buffer, allowing the audio application to write the amount of data directly in a single data transfer into the first virtual memory block and the second virtual memory block independent of temporary buffer allocation and data copies; and wherein the amount of data is automatically transferred out of the first and second virtual memory blocks into the cyclical buffer for extraction and presentation in an audio stream to a user.

9. The computer-readable medium of claim 8, wherein the computer-executable instructions for allowing the audio application to write directly into the doubly mapped virtual memory further comprise computer-executable instructions for communicating a logical memory address pointer to the client indication, the logical memory address pointer indicating a current input position in the first virtual memory block.

10. The computer-readable medium of claim 8, wherein the computer-executable instructions further comprise instructions for:

receiving a request from the audio application to allocate the cyclical buffer for storage of audio data in a particular audio data format; and.

responsive to receiving the request, performing operations of allocating the cyclical buffer.

11. The method of claim 8, wherein the method further comprises transferring data from consecutive logical addresses in the doubly mapped virtual memory into the cyclical buffer, the consecutive logical addresses sequentially corresponding to a last physical address of the cyclic buffer and a first physical address of the cyclic buffer.

12. A computing device comprising:

a processor; and a memory coupled to the processor, the memory comprising computer-program instructions executable by the processor, the computer-program instructions including instructions for:

providing an interface for applications to input data into a cyclical buffer;

responsive to receiving a request via the interface from an application, returning a pointer to a logical address in virtual memory to the application, the virtual memory representing a double consecutive mapping of the cyclical buffer in the virtual memory; the pointer allowing the application to write in a single data transfer directly into virtual memory using at least first and second logical addresses, a first logical address corresponding to an actual physical last address of the cyclical buffer, a second logical address corresponding to an actual physical first address of the cyclical buffer; and wherein data written into the virtual memory is automatically transferred to the cyclical buffer for streaming and presentation to a user.

13. The computing device of claim 12, wherein an end portion of a first virtual mapping is page aligned with a beginning portion of a second virtual mapping, the first and second virtual mappings representing the double consecutive mapping of the cyclic buffer in the virtual memory.

14. The computing device of claim 12, wherein the application is an audio streaming application.

15. The computing device of claim 12, wherein the computer-program instructions further comprise instructions for:

receiving, via the interface, a request from the application to allocate the cyclical buffer; and.

responsive to receiving the request, allocating the cyclic buffer via a device driver.

16. The computing device of claim 12, wherein the computer-program instructions further comprise a structure for transferring data from consecutive logical addresses in the double consecutive mapping into the cyclical buffer.

* * * * *

UNITED STATES PATENT AND TRADEMARK OFFICE
CERTIFICATE OF CORRECTION

| | | |
|---|---|---|
| PATENT NO. | : 7,788,463 B2 | Page 1 of 1 |
| APPLICATION NO. | : 11/674439 | |
| DATED | : August 31, 2010 | |
| INVENTOR(S) | : Kenneth H. Cooper | |

It is certified that error appears in the above-identified patent and that said Letters Patent is hereby corrected as shown below:

In column 6, line 17, in Claim 1, delete "fist" and insert -- first --, therefor.

In column 6, line 47, in Claim 5, delete "and." and insert -- and --, therefor.

In column 7, line 29, in Claim 10, delete "and." and insert -- and --, therefor.

Signed and Sealed this
Tenth Day of May, 2011

David J. Kappos
*Director of the United States Patent and Trademark Office*